(12) United States Patent
Sawdon et al.

(10) Patent No.: US 8,341,122 B2
(45) Date of Patent: Dec. 25, 2012

(54) RESTORE OF FULL SYSTEM BACKUP AND INCREMENTAL BACKUPS USING MULTIPLE SIMULTANEOUS DEVICE STREAMS

(75) Inventors: Wayne A. Sawdon, San Jose, CA (US); Frank B. Schmuck, Campbell, CA (US)

(73) Assignee: International Business Machines Corporation, Armonk, NY (US)

( * ) Notice: Subject to any disclaimer, the term of this patent is extended or adjusted under 35 U.S.C. 154(b) by 495 days.

(21) Appl. No.: 12/644,539

(22) Filed: Dec. 22, 2009

(65) Prior Publication Data

US 2011/0153567 A1 Jun. 23, 2011

(51) Int. Cl.
*G06F 17/30* (2006.01)
(52) U.S. Cl. ........ 707/641; 707/644; 707/645; 707/646; 707/647; 707/652; 707/653; 707/643
(58) Field of Classification Search ................ 707/645, 707/641, 643, 646, 647, 652, 653
See application file for complete search history.

(56) References Cited

U.S. PATENT DOCUMENTS

| | | | |
|---|---|---|---|
| 6,154,852 A | 11/2000 | Amundson et al. | |
| 6,397,229 B1 * | 5/2002 | Menon et al. | 707/641 |
| 6,490,598 B1 | 12/2002 | Taylor | |
| 6,505,216 B1 | 1/2003 | Schutzman et al. | |
| 7,103,740 B1 | 9/2006 | Colgrove et al. | |
| 7,251,749 B1 * | 7/2007 | Fong et al. | 714/20 |
| 7,284,150 B2 | 10/2007 | Ma et al. | |
| 7,330,997 B1 * | 2/2008 | Odom | 714/6.23 |
| 7,366,859 B2 * | 4/2008 | Per et al. | 711/162 |
| 7,398,365 B1 | 7/2008 | Hardman | |
| 7,475,098 B2 * | 1/2009 | Patterson et al. | 1/1 |
| 7,797,279 B1 * | 9/2010 | Starling et al. | 707/641 |
| 7,831,789 B1 * | 11/2010 | Per et al. | 711/162 |

(Continued)

FOREIGN PATENT DOCUMENTS

WO   WO-2007002397 A2   1/2007

(Continued)

OTHER PUBLICATIONS

Green, et al.; "Designing a Fast, On-line Backup System for a Log-Structured File System"; INSPEC/DTJournal; vol. 8., No. 2, 1996.

(Continued)

*Primary Examiner* — Sherief Badawi
(74) *Attorney, Agent, or Firm* — Mitch Harris, Atty at Law, LLC; Andrew M. Harris; Matthew W. Baca

(57) ABSTRACT

A technique for restoring file systems by applying full and incremental backups together while streaming them from multiple devices provides a faster system restore from a full backup where incremental backups must also be applied. A first storage device streams the full backup while at least one second storage device streams at least one incremental backup. As files are detected in the incremental backup, they are written instead of the corresponding file in the full backup. Incremental backups can be pre-merged to reduce their number to one less than a number of storage devices available to stream the backups, so that the full backup can be streamed along with the pre-merged incremental backup(s) to restore the file system.

12 Claims, 3 Drawing Sheets

U.S. PATENT DOCUMENTS

| | | |
|---|---|---|
| 7,974,952 B1 * | 7/2011 | Reitmeyer et al. ............ 707/641 |
| 2002/0107877 A1 * | 8/2002 | Whiting et al. ............... 707/204 |
| 2003/0182301 A1 | 9/2003 | Patterson et al. |
| 2006/0064444 A1 * | 3/2006 | van Ingen et al. ............ 707/204 |
| 2007/0294320 A1 | 12/2007 | Yueh et al. |
| 2009/0177718 A1 * | 7/2009 | Patterson et al. ............. 707/204 |
| 2009/0249005 A1 * | 10/2009 | Bender et al. ................. 711/162 |
| 2010/0274763 A1 * | 10/2010 | Ingen et al. ................... 707/645 |

FOREIGN PATENT DOCUMENTS

| | | |
|---|---|---|
| WO | WO-2007103289 A2 | 9/2007 |

OTHER PUBLICATIONS

Schwendemann, et al.; "Backward Restore From Incremental Backup"; IP.COM/IBM TDB; n4a 09-91 pp. 24-26; Sep. 1, 1991.

Lomet, et al.; "High Speed On-line Backup When Using Logical Log Operations"; ACM Digital Library; pp. 34-47; 2000.

Cecchet, et al.; "Middleware-based Database Replication: The Gaps Between Theory and Practice"; ACM Digital Library; pp. 739-750, Jun 9-12, 2008.

* cited by examiner

RESTORE OF FULL SYSTEM BACKUP AND INCREMENTAL BACKUPS USING MULTIPLE SIMULTANEOUS DEVICE STREAMS

BACKGROUND OF THE INVENTION

1. Field of the Invention

The present invention is related to storage file systems within computer systems, and more specifically to a system restore methodology that restores full and incremental backups using multiple simultaneous device streams.

2. Description of Related Art

In large-scale computer systems, after a catastrophic event such as a total system failure or when a software upgrade must be backed-out due to problematic changes to the operating system or other components of the software, a full file system restore may need to be performed. When a full system backup is available, the process of performing a full system restore is typically streamlined by writing large sequential chunks of restore data to the storage containing the file system to be restored. If the backup is be partitioned, e.g., into multiple independent volumes, the restore image can be written simultaneously from several backup streams, which are generally provided from slower devices such as magnetic tape storage devices. Since the backup devices are typically the limiting bandwidth for the restore process, using a larger number of backup devices reduces the time required to restore the file system.

However, in a typical system backup management scheme, a full backup is performed at predetermined intervals, e.g., weekly intervals, and incremental backups are performed more frequently, e.g., at the end of every business day or on an even shorter interval. If the backup being restored requires several incremental updates, then the restore process can be slowed significantly by having to apply the full system backup and then each incremental backup. Further, a full system backup with incremental backups are not typically restored from multiple device streams, since the incremental backups take precedence over the full backup and any earlier incremental backups.

Therefore, it would be desirable to provide for restoring full and incremental system backups together using multiple device streams.

BRIEF SUMMARY OF THE INVENTION

The invention is embodied in a computer program product and computer system that provides for restore from full and incremental backups from multiple device streams when restoring a file system to a target storage within a computer system.

The computer program product and computer system copy files to restore a file system from multiple restore devices and streams incremental backups along with the full system backups by reading the full backup from a first storage device and while the full backup is being read, also reading at least one incremental backup from a corresponding at least one other storage device. Files read from the full backup are selectively not written from the full backup, but are written to the target storage from the incremental backup as the files are found in the incremental backup.

If insufficient storage devices are available to restore all of the incremental backups along with the full backup, then incremental backups can be pre-merged to a temporary storage to reduce the number of incremental backups that are required. The pre-merging process can be repeated until the number of merged incremental backups is one less than the number of available storage devices for reading the backups, so that the pre-merged backups and the full backup can be streamed to restore the file system. The pre-merging can be performed as part of the backup or part of the restore processing.

The foregoing and other objectives, features, and advantages of the invention will be apparent from the following, more particular, description of the preferred embodiment of the invention, as illustrated in the accompanying drawings.

BRIEF DESCRIPTION OF THE SEVERAL VIEWS OF THE DRAWING

The novel features believed characteristic of the invention are set forth in the appended claims. The invention itself, however, as well as a preferred mode of use, further objectives, and advantages thereof, will best be understood by reference to the following detailed description of the invention when read in conjunction with the accompanying Figures, wherein like reference numerals indicate like components, and:

DETAILED DESCRIPTION OF THE INVENTION

The present invention relates to computer backup and restore systems, and in particular to file system restore operations performed from multiple streaming devices in which a full backup and one or more incremental backups are applied in a single operation. The backup images are ordered and the incremental and full backup images are merged on the fly, so that the images can be streamed from multiple restore devices without requiring successive application of the incremental backups after the full backup has been restored, as is typically performed in file system restore operations. If the number of incremental backups combined with the full backup exceeds the number of streaming devices available, then multiple incremental backups are pre-merged to a single backup image on a temporary storage and then the merged image is further merged with the full backup and any remaining incremental backups.

Figure 1:
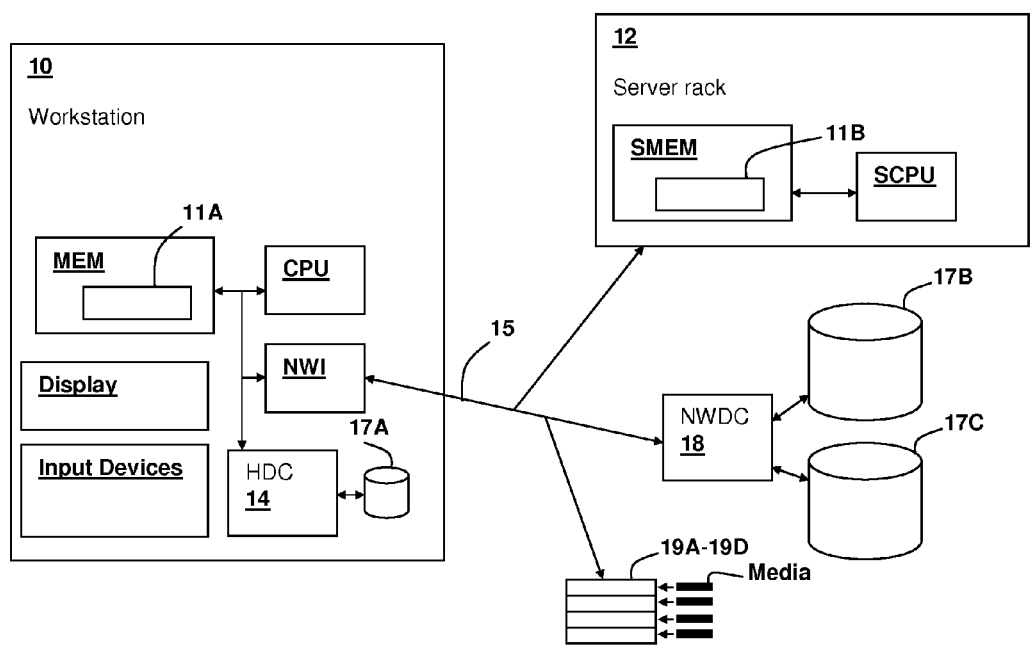
FIG. 1 is a block diagram illustrating a networked computer system in which techniques according to an embodiment of the present invention are practiced.

Referring now to FIG. 1, a networked computer system in which an embodiment of the present invention is practiced is depicted in a block diagram. A workstation computer system 10 includes a processor CPU coupled to a memory MEM that contains program instructions for execution by CPU, including a virtual file system (VFS) interface 11A, which provides a native file system interface to the particular operating system executed by workstation computer system 10, for example the WINDOWS operating system. Workstation computer 10 is also depicted as including a graphical display Display and input devices Input Devices, such as mice and keyboards, for interacting with user interfaces including login screens and other user interfaces for interacting with other computers connected to the network, for example, administration screens for administering selection of the full and incremental backups to apply, and to control or edit scheduling of the backup processes and initiate the restore processes of the present invention. Workstation computer system also includes a hard disc controller HDC 14 that interfaces processor CPU to local storage device 17A and a network interface that couples workstation computer system 10A to network 15, which may be fully wireless, fully wired or any type of hybrid network. VFS interface 11A provides a uniform set of application programming interfaces (APIs) that provide access to resources, such as local storage 17A or remote storage such as storage devices 17B and 17C, which are coupled to network 15 by network disc controller (NWDC) 18.

A server rack computer system 12, having at least one server memory SMEM and a server processor SCPU is also shown coupled to network 15. A different VFS client 11B is provided and executed within workstation computer system 10B to provide suitable native APIs for accessing storage within server rack 12, networked storage devices 17B and 17C, as well as storage device 17A within workstation computer system 10, if storage device 17A is shared. A system configuration as is generally used with the present invention will include a large number of workstation computer systems such as workstation 10 and a large number of server racks such a server rack 12. Storage within such a computer system will also generally include large arrays of storage devices. However, the techniques of the present invention are not dependent on scale and therefore can be practiced within smaller system configurations, as well. A number of backup and restore devices 19A-19D, e.g., magnetic tape drives, are coupled to network 15 for generating and reading multiple backup/restore images on media MEDIA, such as backup tapes, as will be described in further detail below. The backup operations of the present invention can be controlled by either or both of VFS client 11A and 11B or another process executing within server rack 12 workstation computer system 10 or another system coupled to network 15 including processes executing within controllers within networked storage devices 17B and 17C. In general, the present invention reads images from backup storage such as media MEDIA that is installed in one or more restore devices such as devices 19A-19D, and then restores a file system from the backup images onto a target storage such as networked storage devices 17B and 17C.

Network 15 may include wireless local area networks (WLANs), wired local-area networks (LANs), wide-area networks (WANs) or any other suitable interconnection that provides communication between workstation computer system 10 and server rack 12, storage devices 17A-17C, and any other systems and devices coupled to network 15. Further, the present invention concerns backup and restore functionality that is not limited to a specific computer system or network configuration. Finally, the specification of workstation computer system 10 and server rack 12 and the location of their specific memory MEM and file system interface objects 11A and 11B does not imply a specific client-server relationship or hierarchical organization, as the techniques of the present invention may be employed in distributed systems in which no particular machine is identified as a server, but at least one of the machines provides an instance and functionality of a program or object that performs backup and restore operations in accordance with an embodiment of the present invention. The objects or interfaces process accesses according to methods and structures of the present invention, as described in further detail below.

Figure 2:
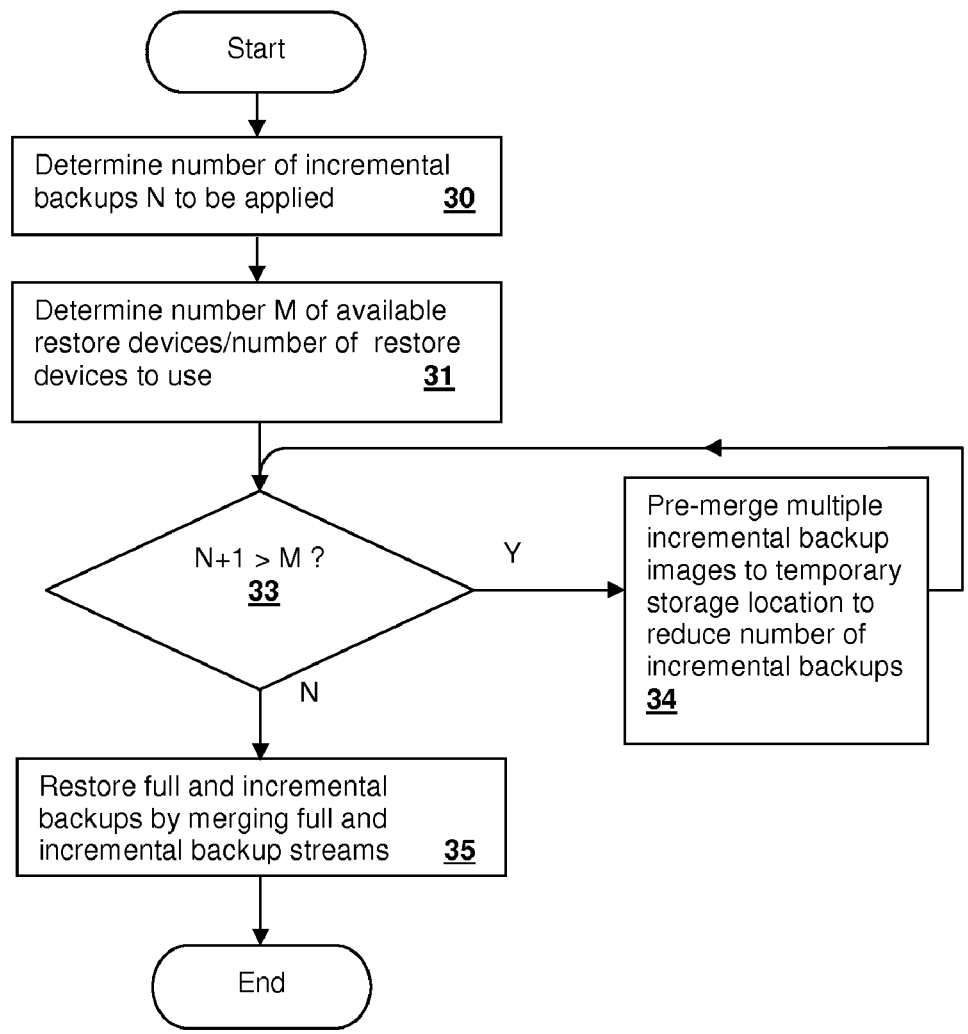
FIG. 2 is a flow chart of a file system restore method in accordance with an embodiment of the present invention.

Referring now to FIG. 2, a file system restore method in accordance with an embodiment of the present invention is illustrated in a flowchart. In the depicted method, first the number of incremental backups N to be applied is determined (step 30) and the number M of available restore devices is also determined (step 31). If N+1>M, i.e. the number of incremental backups N incremented to include the full backup is greater than the number M of available restore devices (decision 33), then multiple incremental backups are pre-merged to a temporary storage location to reduce the number of incremental backups (step 34). Step 34 and decision 33 are repeated until the remaining incremental backups and the full backup can be simultaneously read by the available restored devices. Then, the full and incremental backups are restored by merging the full and incremental backup streams.

The temporary image generated by the pre-merging operations contains at most one copy of each file. The total amount of data in the temporary image cannot exceed the total amount of data to be restored. Therefore, there will be sufficient space in the storage allocated for the file system to hold the result of each pre-merge step. The pre-merge operations can be performed on any subset of the incremental backups, and there is an advantage in pre-merging the smallest incremental backups, so that the temporary image is as small as possible. When performing multiple pre-merge steps, the disk space occupied by the temporary image from the previous pre-merge step can be freed as data is being copied to the final location of the file system, so that the total of the temporary image and the restored portions of the file system are still guaranteed to fit in the allocated space. Similarly, during the final merge and restore from the full backup, the temporary image and any additional incremental backups, the disk space in the temporary file from the last pre-merge operation can be freed as its data is being read during the copy operations. Some operating systems such as AIX support a system call (e.g., fclear) that frees disk space within an existing file as it is no longer needed. In systems that do not support such operations, during restore operations where remaining storage space becomes a critical factor, the temporary image generated by the pre-merge is broken up into a sequence of smaller temporary files, so that the smaller files can be deleted as their data is no longer needed.

In one embodiment of the invention, the pre-merge operation(s) always merges the newest incremental backups first. Since the files in the temporary image will therefore be more recent than the files in all of the other incremental backups and the full backup, the temporary image may be stored directly in the target storage for the file system as the final data. An abbreviated summary of the temporary image, e.g., a list of files in the temporary image, may be generated to list the restored files without their data or attributes. Subsequent pre-merge operations, as well as the final merge with the full backup can then refer to the abbreviated summary to determine if more recent data has already been restored. The abbreviated summary may be updated at each pre-merge operation if multiple pre-merge operations are performed using the most recent incremental backups at each pass.

Figure 3:
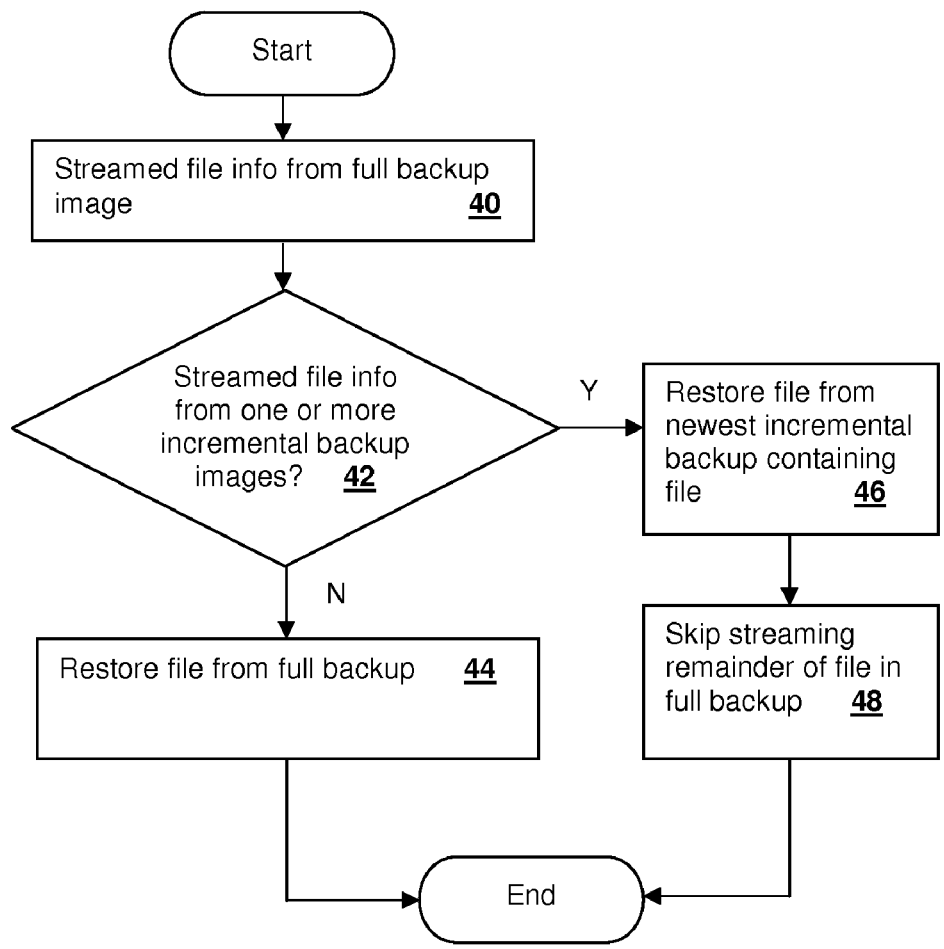
FIG. 3 is a flow chart of a merge operation used in the file system restore algorithm depicted in FIG. 2.

Referring now to FIG. 3, a merge operation as used in the algorithm of FIG. 2 is shown. Once file information is streamed from the full backup image (step 40), if file info from the same file has been streamed from one or more incremental backup images (decision 42), then the file will be restored from the newest incremental backup containing the file (step 46) and the remainder of the file in the full backup can be skipped (step 48). Otherwise if the file was only present in the full backup image, then the file is restored from the full backup image (step 44).

The backup images are similar to backup images generally used by backup/restore processes, but the files are generally arranged sequentially on the backup media in a canonical order so that the incremental backup(s) can be streamed along with the full backups, to minimize the required restore time. In order to accomplish the ordering, the files are generally ordered by inode or alphabetically according to their full directory path. When reading the media, the media is read far enough ahead to determine the file information, e.g., file name or inode number, so that a comparison can be made to determine the newest incremental backup containing the file, without interrupting streaming. When using a summary of a merged stream as described above, the summary need only contain the file identifiers.

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. A computer system comprising a processor for executing program instructions and a memory coupled to the processor for executing the program instructions, wherein the program instructions include program instructions for restoring a file system to a target storage, wherein the program instructions comprise program instructions for:
   first reading a first backup stream containing a full backup of the file system from a first one of the multiple storage devices;
   while performing the first reading, second reading at least one second backup stream containing a corresponding at least one incremental backup of the file system from a corresponding at least one second one of the multiple storage devices;
   determining whether the at least one second backup stream contains a copy of a file read by the first reading;
   responsive to determining that the at least one second backup stream does not contain the copy of the file read by the first reading, first writing the file read by the first reading to the target storage;
   responsive to determining that the at least one second backup stream contains the copy of the file read by the first reading, second writing the file read by the second reading to the target storage
   third reading a first one of the at least one incremental backup;
   fourth reading a second one of the at least one incremental backup;
   determining whether the second one of the at least one incremental backup contains a copy of another file read by the third reading;
   responsive to determining that the second one of the at least one incremental backup stream does not contain the copy of the another file read by the third reading, third writing the another file read by the third reading to a temporary storage to generate a merged incremental backup; and
   responsive to determining that the second one of the at least one incremental backup does not contain the copy of the another file read by the third reading, fourth writing the file read by the fourth reading to the temporary storage to generate the merged incremental backup, and wherein the second reading reads the temporary storage to read the merged incremental backup subsequent to the writing of the another file to the temporary storage, and wherein the program instructions for third reading, fourth reading, third writing and fourth writing are executed prior to executing the program instructions for first reading, second reading, first writing and second writing.

2. The computer system of claim 1, wherein the full backup and the at least one incremental backup store files of the file system in a common canonical order and wherein the program instructions further comprise program instructions for:
   continuing the first reading the first backup stream;
   subsequent to writing the file written read by the second reading to the target storage, continuing the second reading the second backup stream to determine an identifier of a next file in the corresponding at least one incremental backup;
   comparing identifiers of files read by the first reading with the identifier of the next file I the corresponding at least one incremental backup; and
   halting the second reading the second backup stream until a result of the comparing indicates the next file has been reached in the first backup stream.

3. The computer system of claim 2, wherein the common canonical order of the files in the full backup and the at least one incremental backup is an order according to inodes of the files.

4. The computer system of claim 2, wherein the common canonical order of the files in the full backup and the at least one incremental backup is an alphabetical ordering of the files.

5. The computer system of claim 1, wherein the program instructions further comprise program instructions for determining that a number of the multiple storage devices is insufficient to stream the full backup and all of the incremental backups needed to perform the restoring of the file system, and wherein the program instructions for third reading, fourth reading, third writing and fourth writing are executed responsive to determining that the number of the multiple storage devices is insufficient.

6. The computer system of claim 5, wherein the program instructions further comprise program instructions for:
   dividing one more than the number of all of the needed incremental backups by the number of the multiple storage devices to generate a number of pre-merging iterations required;
   repeating execution of the program instructions for performing the third reading, the fourth reading, the third writing and the fourth writing to generate merged incremental backups for each of the pre-merging iterations; and
   executing the program instructions for performing the first reading, the second reading, the first writing and the second writing subsequent to completing the pre-merging iterations.

7. A computer program product comprising computer-readable storage device storing program instructions for execution within a computer system, wherein the program instructions include program instructions for restoring a file system to a target storage, wherein the program instructions comprise program instructions for:
   first reading a first backup stream containing a full backup of the file system from a first one of the multiple storage devices;
   while performing the first reading, second reading at least one second backup stream containing a corresponding at least one incremental backup of the file system from a corresponding at least one second one of the multiple storage devices;
   determining whether the at least one second backup stream contains a copy of a file read by the first reading;
   responsive to determining that the at least one second backup stream does not contain the copy of the file read by the first reading, first writing the file read by the first reading to the target storage;

responsive to determining that the at least one second backup stream contains the copy of the file read by the first reading, second writing the file read by the second reading to the target storage third reading a first one of the at least one incremental backup;

fourth reading a second one of the at least one incremental backup;

determining whether the second one of the at least one incremental backup contains a copy of another file read by the third reading;

responsive to determining that the second one of the at least one incremental backup stream does not contain the copy of the another file read by the third reading, third writing the another file read by the third reading to a temporary storage to generate a merged incremental backup; and responsive to determining that the second one of the at least one incremental backup does not contain the copy of the another file read by the third reading, fourth writing the file read by the fourth reading to the temporary storage to generate the merged incremental backup, and wherein the second reading reads the temporary storage to read the merged incremental backup subsequent to the writing of the another file to the temporary storage, and wherein the program instructions for third reading, fourth reading, third writing and fourth writing are executed prior to executing the program instructions for first reading, second reading, first writing and second writing.

8. The computer program product of claim 7, wherein the full backup and the at least one incremental backup store files of the file system in a common canonical order and wherein the program instructions further comprise program instructions for:

continuing the first reading the first backup stream;

subsequent to writing the file written read by the second reading to the target storage, continuing the second reading the second backup stream to determine an identifier of a next file in the corresponding at least one incremental backup;

comparing identifiers of files read by the first reading with the identifier of the next file I the corresponding at least one incremental backup; and halting the second reading the second backup stream until a result of the comparing indicates the next file has been reached in the first backup stream.

9. The computer system of claim 8, wherein the common canonical order of the files in the full backup and the at least one incremental backup is an order according to inodes of the files.

10. The computer system of claim 8, wherein the common canonical order of the files in the full backup and the at least one incremental backup is an alphabetical ordering of the files.

11. The computer system of claim 7, wherein the program instructions further comprise program instructions for determining that a number of the multiple storage devices is insufficient to stream the full backup and all of the incremental backups needed to perform the restoring of the file system, and wherein the program instructions for third reading, fourth reading, third writing and fourth writing are executed responsive to determining that the number of the multiple storage devices is insufficient.

12. The computer system of claim 11, wherein the program instructions further comprise program instructions for:

dividing one more than the number of all of the needed incremental backups by the number of the multiple storage devices to generate a number of pre-merging iterations required;

repeating execution of the program instructions for performing the third reading, the fourth reading, the third writing and the fourth writing to generate merged incremental backups for each of the pre-merging iterations; and executing the program instructions for performing the first reading, the second reading, the first writing and the second writing subsequent to completing the pre-merging iterations.

* * * * *